G. K. HENDERSON.
METAL WHEEL AND TIRE RIM.
APPLICATION FILED SEPT. 11, 1920.
1,411,783.
Patented Apr. 4, 1922.
2 SHEETS—SHEET 2.
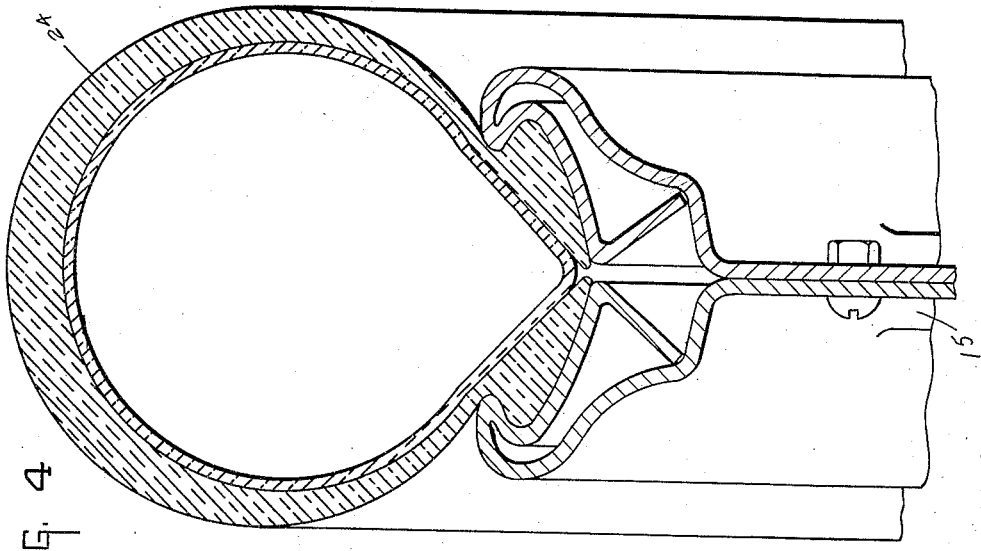
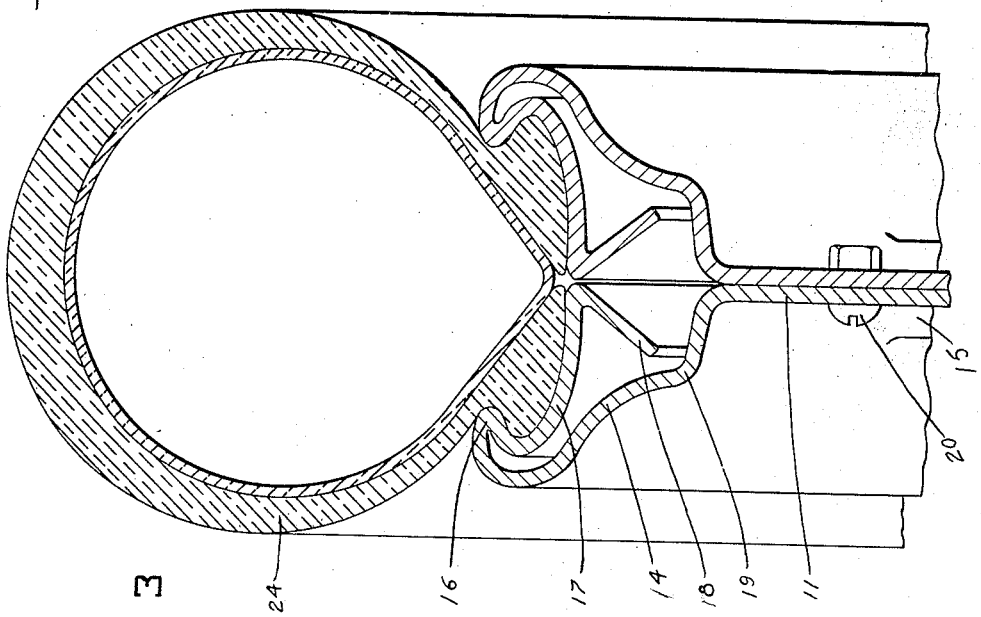
GEORGE K. HENDERSON,
INVENTOR.
BY
*Lockwood & Lockwood*
ATTORNEYS

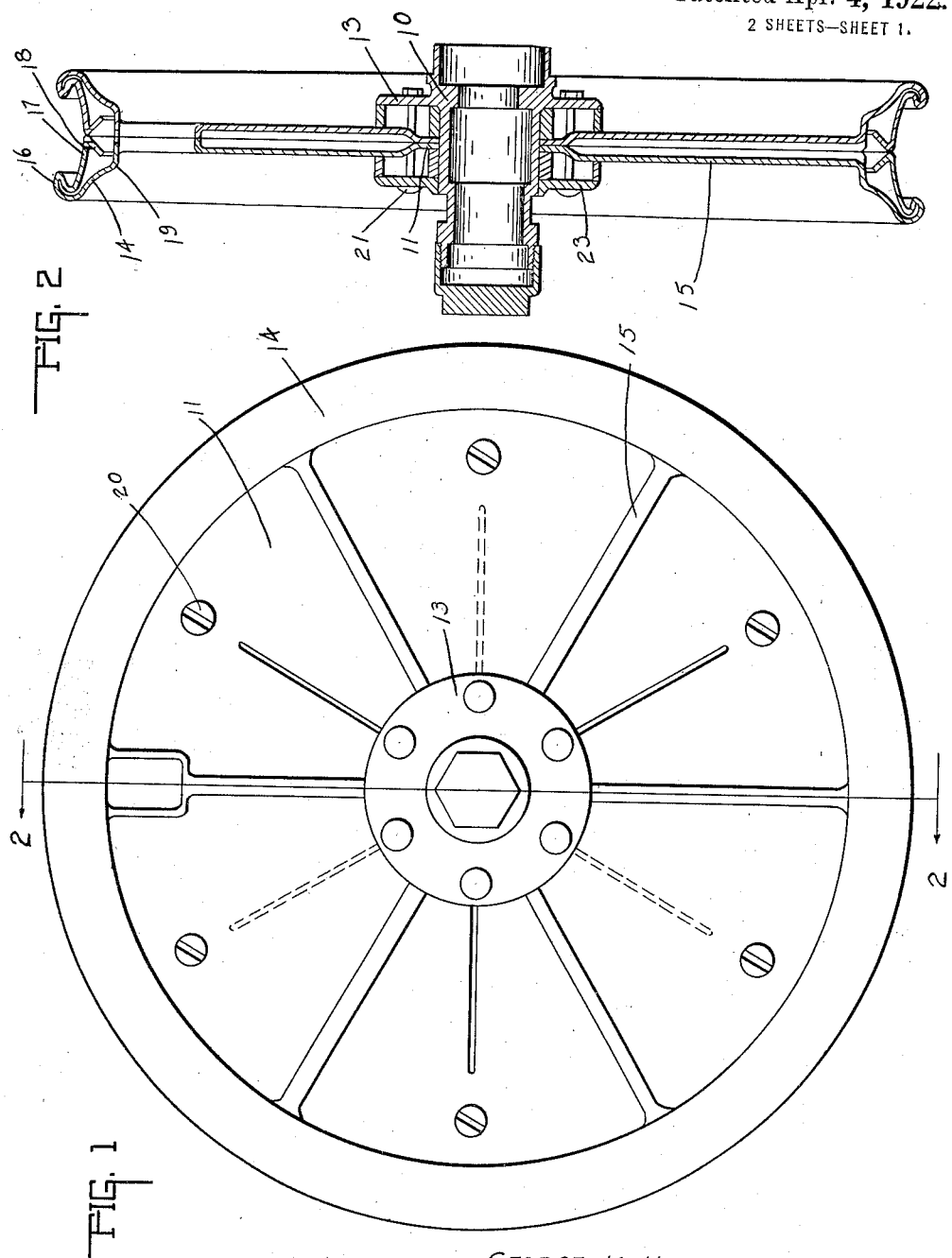

UNITED STATES PATENT OFFICE.

GEORGE K. HENDERSON, OF INDIANAPOLIS, INDIANA.

METAL WHEEL AND TIRE RIM.

1,411,783.   Specification of Letters Patent.   Patented Apr. 4, 1922.

Application filed September 11, 1920. Serial No. 409,514.

*To all whom it may concern:*

Be it known that I, GEORGE K. HENDERSON, a citizen of the United States, and a resident of Indianapolis, county of Marion, and State of Indiana, have invented a certain new and useful Metal Wheel and Tire Rim; and I do hereby declare that the following is a full, clear, and exact description thereof, reference being had to the accompanying drawings, in which like numerals refer to like parts.

This invention relates to a disk vehicle wheel, and particularly to the construction thereof and the tire rim.

The main object desired to be accomplished by this invention is to so construct the vehicle wheel as to make it very substantial and cheap and do away with the use of wood. Whereas wheels of a similar type have been made heretofore for juvenile wagons and toys, it is the purpose of this invention to so construct a wheel that it may be adapted for use with motor vehicles and will have the strength necessary for that purpose. On the other hand, it is desired to construct such a wheel whereby it may be made in large quantities for production very cheaply, whereby the cost of constructing the metal disk wheels, such as are now in use, would be greatly lessened. This is accomplished by forming two wheel halves, identical in form, which may be made from the same dies, whereby said halves may be placed together to form a single disk wheel. Further advantages of this feature of the invention reside in the formation of the wheel halves so that they may be made in quantity production by a simple stamping and rolling process.

Another feature of the invention lies in the construction and formation of the tire rim, whereby it will be formed integral and arranged so that the greater the load on the wheel, the more tightly the bead of the tire will be clamped by the flanges of the rim.

The full nature of the invention will be understood from the accompanying drawings and the following description and claims.

In the drawings, Fig. 1 is a side elevation of the wheel. Fig. 2 is a central vertical cross section therethrough. Fig. 3 is an enlarged radial section taken through the wheel rim and tire, in normal position. Fig. 4 is the same as Fig. 3 showing the rim and tire in clamped position with the weight of pressure thereon.

In the drawings there is shown a vehicle wheel having a hub 10, metal disk member 11, hub flange 13 and rim 14.

The disk wheel is formed in two wheel halves of identical formation and construction, consisting of a sheet metal plate of substantially the same thickness throughout stamped out with the ribs 15 formed radially thereof acting in the nature of spokes, and with a flanged inner rim portion 14 stamped integral with the disk portion, extending outwardly and upwardly, substantially as shown in Figs. 2, 3 and 4. A disk of this construction having been stamped out with the inner rim portion formed thereon, the outer periphery of the rim is rolled over and turned inwardly so as to form a bead 16, the turned in portion being further formed to provide an outer peripheral rim portion 17 with an angularly disposed annular member 18 projecting inwardly toward the inner surface of the inner rim portion. Said member extends toward an annular recessed portion 19 of said rim, but it does not engage the surface thereof, there being an appreciable space between the edge of said member and the rim.

The wheel halves having been stamped and rolled to the form shown and described, they are placed together, as shown in Fig. 2, and secured together by the bolts 20 or rivets about their outer periphery, and by the bolts 21 extending through the hub flange 13 and retaining disk 23. With the two wheel halves fixedly secured together in the manner described, the disk wheel is formed.

Upon mounting the tire 24 on the wheel, as shown in Fig. 3, the bead 16 will normally clamp against the tire in the usual manner and the members 18 will remain spaced away from the annular depression 19 of the rim 14, as shown in Fig. 3. However, upon the load being carried by the wheel and tire, or upon a force striking against the tire, it will press radially inwardly upon the outer rim portion 17, causing the same to be forced inwardly, which will naturally cause the beads 16 to clamp together exerting a firmer grip, and hold the tire in position. The gripping of the tire will be, however, limited by the space between the members 18 and the portion 19; and upon said members being forced through this space into contact with said portion 19, as shown in Fig. 4, the further clamping will be prevented. Therefore, a positive and additional clamping of the tire is effected when it is necessary, and excessive clamping is prevented.

The invention claimed is:

1. A tire rim for vehicle wheels comprising an inner rim portion, outer rim portions separated from each other, said outer rim portions being turned inwardly from said inner rim portion for forming beads in position to engage a tire casing, said inner rim portions being so arranged that a pressure thereon by said tire casing will cause the bead portions to be brought toward each other for further clamping said casing therein.

2. A tire rim for vehicle wheels comprising an inner rim portion, outer rim portions separated from each other, said outer rim portions being turned inwardly from said inner rim portion for forming beads in position to engage a tire casing, said outer rim portions being so arranged that a pressure thereon by said tire casing will cause the beads to be brought toward each other for further clamping said casing therein, and means on said outer rim portions for limiting the movement thereof, and thereby limiting the clamping movement of said beads.

3. A tire rim for vehicle wheels comprising an inner rim portion, outer rim portions separated from each other, said outer rim portions being turned inwardly from said inner rim portion for forming beads in position to engage a tire casing, said outer rim portions being so arranged that a pressure thereon by said tire casing will cause the beads to be brought toward each other for further clamping said casing therein, and angularly projecting members on said outer rim portions extending toward said inner rim portion and spaced therefrom adapted to limit the movement of said outer rim portions, and the clamping movement of said beads.

In witness whereof, I have hereunto affixed my signature.

GEORGE K. HENDERSON.